Figure 1:
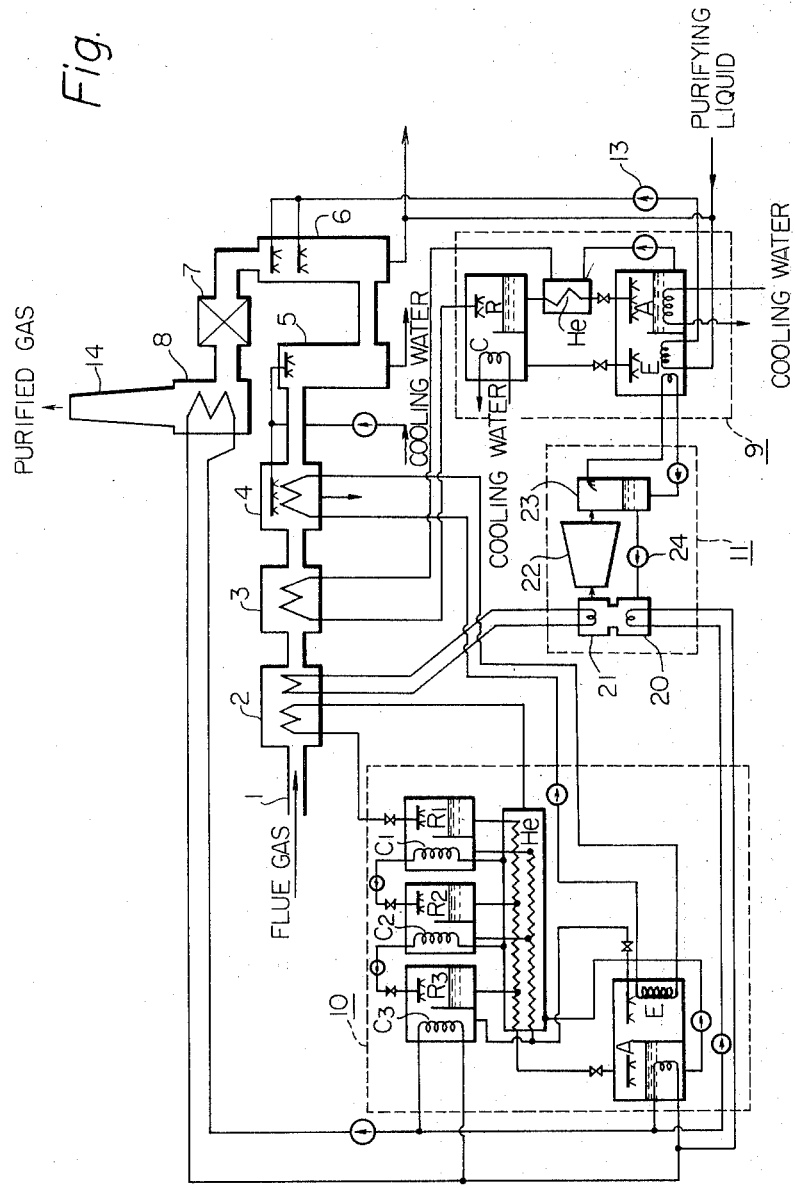

United States Patent [19]
Maniya

[11] 3,839,849
[45] Oct. 8, 1974

[54] WET TYPE DESULFURIZATION SYSTEM FOR FLUE GAS

[76] Inventor: Gohee Maniya, 11-6, Mitsuzawa Kamicho, Kanagawa, Yokohama, Japan

[22] Filed: Aug. 16, 1972

[21] Appl. No.: 280,957

[30] Foreign Application Priority Data
Aug. 24, 1971  Japan............................... 46-64626

[52] U.S. Cl.......................... 55/222, 55/73, 55/228, 62/238
[51] Int. Cl........................................... B01d 53/14
[58] Field of Search ............. 62/304, 305, 309, 310, 62/238; 261/DIG. 41, 138, 151, 152, 149, 150, 157, 159, 17; 55/222, 268, 269, 73, 228

[56] References Cited
UNITED STATES PATENTS

| | | | |
|---|---|---|---|
| 2,410,457 | 11/1946 | Nettel | 62/238 |
| 2,785,879 | 3/1957 | Cramp | 261/DIG. 9 |
| 3,153,914 | 10/1964 | Meckler | 62/96 X |
| 3,198,441 | 8/1965 | Facius | 261/DIG. 11 |
| 3,277,179 | 10/1966 | Sze | 261/151 X |
| 3,423,078 | 1/1969 | May | 261/151 X |
| 3,447,492 | 6/1969 | Kreimann | 55/222 |
| 3,718,008 | 2/1973 | Zusmanovich | 62/309 |
| 3,733,777 | 5/1973 | Huntington | 261/151 X |

FOREIGN PATENTS OR APPLICATIONS
1,960,135    11/1969    Germany .............................. 55/222

Primary Examiner—Bernard Nozick

[57] ABSTRACT

An improved apparatus of a wet type for desulfurization of flue gas is provided which purges sulfureous pollutants from the flue gas, wherein an absorption process of the flue gas in a purifying liquid at a low temperature and the subsequent heating process of the purified gas to allow it to diffuse into the atmosphere effectively are carried into effect by utilizing the heat energy of the flue gas.

3 Claims, 5 Drawing Figures

WET TYPE DESULFURIZATION SYSTEM FOR FLUE GAS

This invention relates to a wet type apparatus for desulfurization of flue gas and particularly relates to a gas-purification system providing a high efficiency of desulfurization by effectively applying the heat energy of the flue gas to the desulfurization process.

In the conventional wet type desulfurization system, there is a tendency to obtain a higher absorption efficiency of the gaseous pollutants, that is sulfureous gases, at lower gas absorption temperatures of the purifying liquid. This is because it is possible with such lower temperatures to construct the purifying on a smaller scale. Another aspect of this, however, is that a problem arises concerning the resultant gas. That is, the desulfurized gas, having passed through the purifying liquid, is of the lower temperature. Consequently, it is difficult to exhaust the purified gas from the system and diffuse it into the atmosphere.

The present invention overcomes the above stated objectionable features of the prior art and has as its objective the provision of a gas-purification system which effectively purges the sulfureous pollutants from the flue gas, wherein an absorption process of the flue gas in the purifying liquid at a low temperature and the subsequent heating process of the purified gas to allow it to diffuse into the atmosphere are effectively carried into effect by utilizing the heat energy of the flue gas.

Briefly stated, the present invention relates to a wet type system for desulfurization of the flue gas, having an absorption refrigerator and a heat pump of the absorption refrigeration type. It thereby generates a lower temperature heat and a higher temperature heat respectively from part of the heat of the flue gas. The purifying liquid is cooled by the lower temperature heat to absorb $SO_2$ at a lower temperature than that for the conventional system. At the same time the resultant gas, desulfurized by the absorption operation is heated by the higher temperature heat so as to be exhausted out of the system at a relatively high temperature.

According to the inventive system, it is possible to provide an absorption temperature of less than 10° C and to heat up the purified gas to a temperature of 50° C. The purified gas cannot diffuse effctively from the stack into the atmosphere unless its temperature is more than 100° C. It is preferable therefore to heat up the 50° C purified gas to a temperature of more than 100° C by mixing the gas with the other combustion gas at a higher temperature. In such a temperature increasing process, a relatively small amount of the combustion gas is required because the purified gas can be heated up to a temperature of 50° C in the system.

The system according to the invention will become apparent from the following detailed description set forth in connection with the accompanying drawings. This description relates to a preferred embodiment of the present invention and is given by way of illustration.

Figure 2:
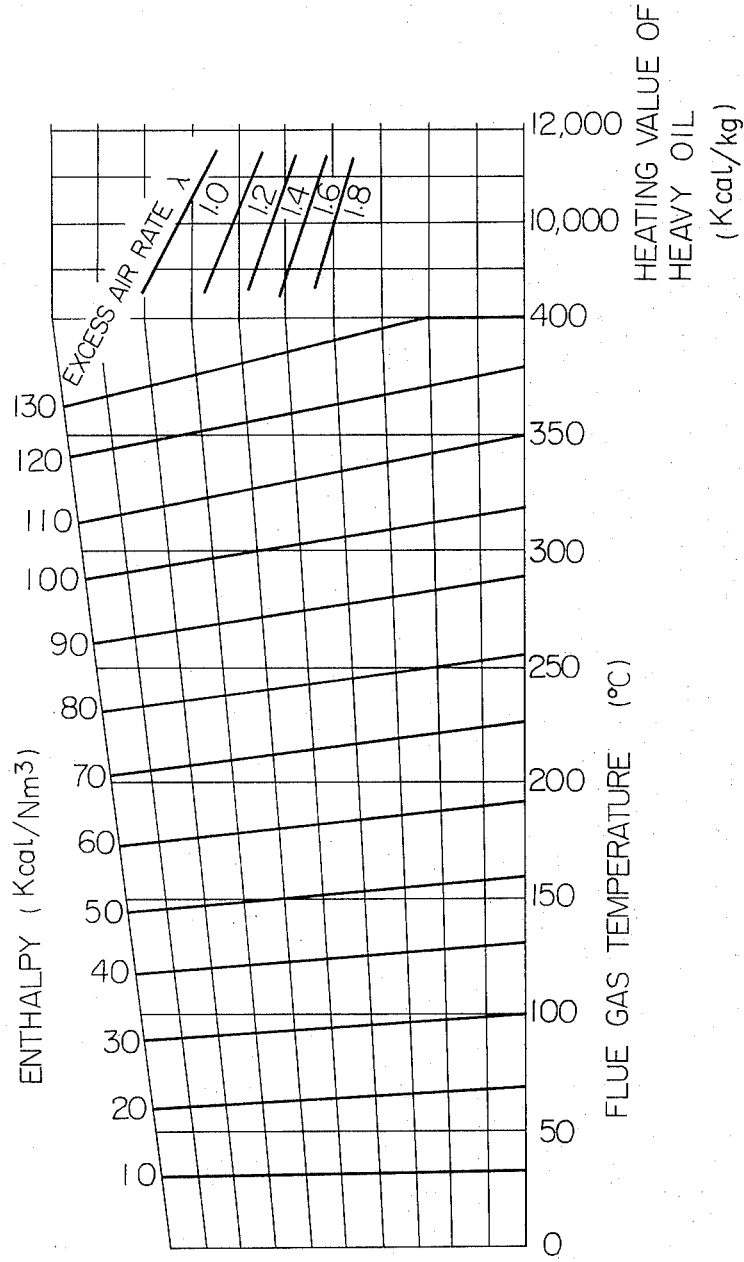
Figure 3:
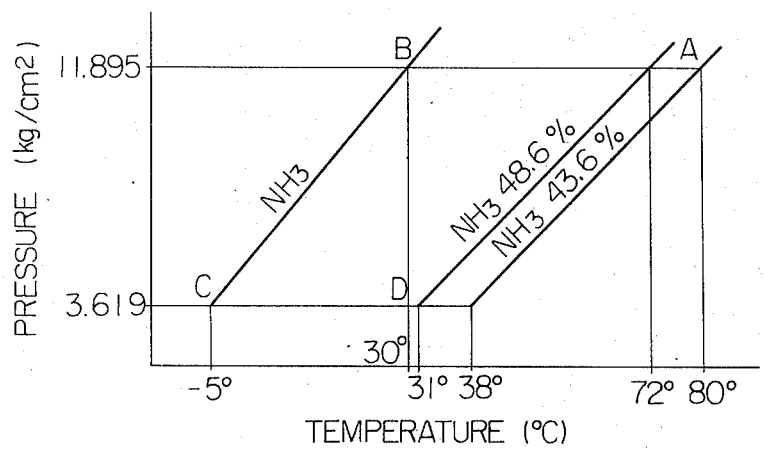
Figure 4:
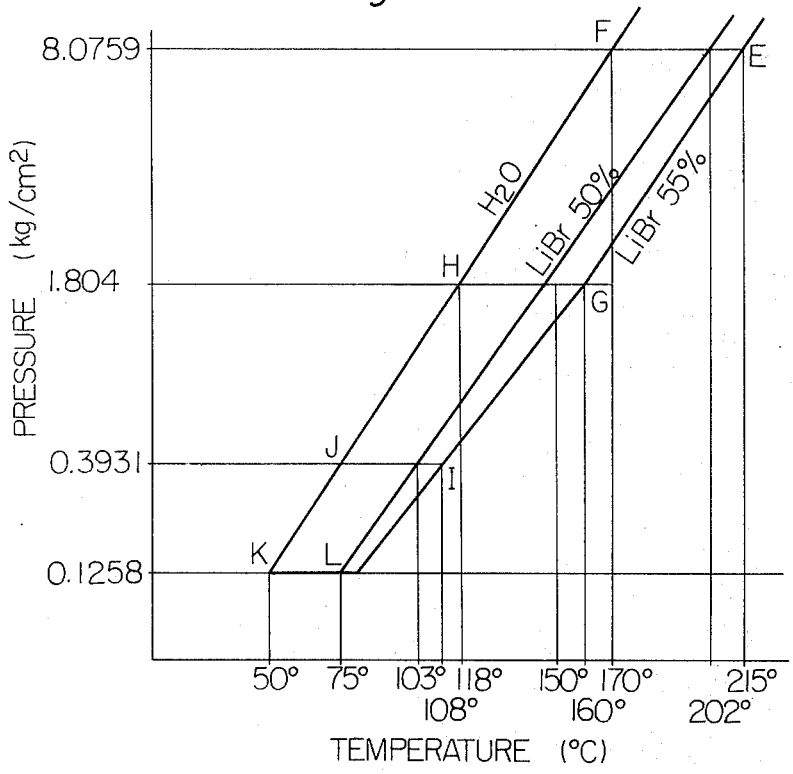
Figure 5:
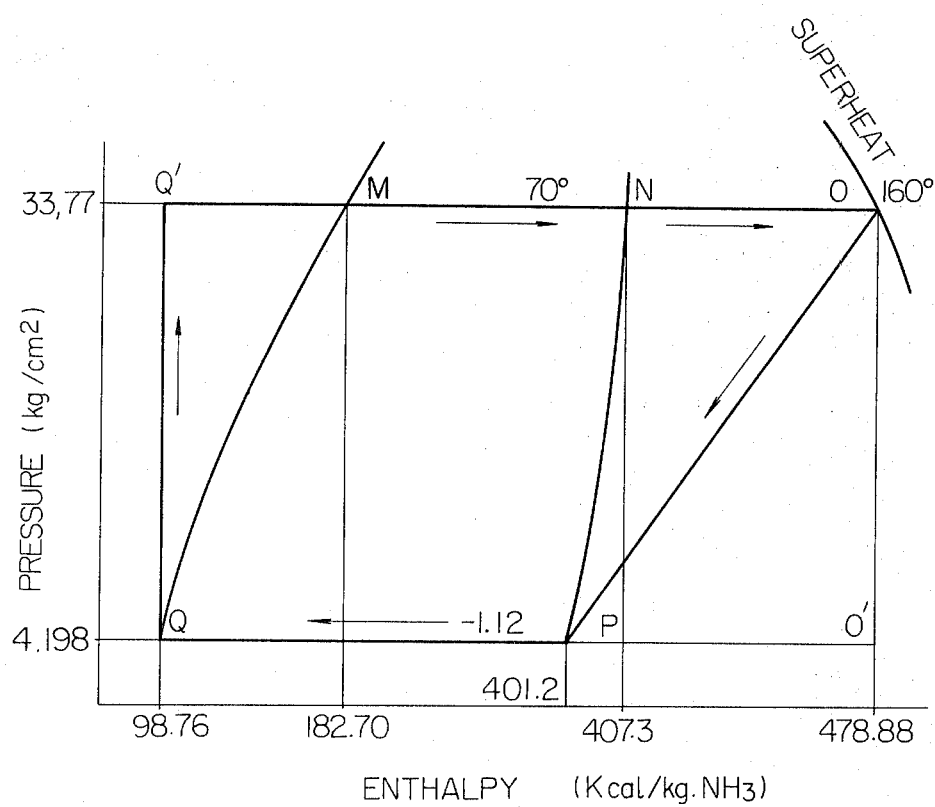

FIG. 1 is a schematically illustrated flow diagram for the preferred embodiment of the wet type system for desulfurization of the flue gas according to the present invention, FIG. 2 is a diagram showing enthalpy-temperature curves of the flue gas in connection with the heating value of heavy oil and excess air rate, FIG. 3 is a Duhring diagram showing the cycle of refrigerant vapor and solution in the ammonia absorption refrigerator used in the apparatus for cooling, FIG. 4 is a Duhring diagram showing the cycle of refrigerant vapor and solution in the heat pump of an absorption refrigeration type used in the system for heating, FIG. 5 is a mollier diagram showing the cycle of ammonia in the refrigerant turbine used in the system.

Referring to the embodiment of the invention as shown in FIG. 1, the system comprises first, second and third heat exchangers 2, 3, 4, for removing the heat energy, a cooling tower 5, an absorbing tower 6, a blower 7, and a heater 8 for the exhaust gas; an absorption refrigerator 9, a heat pump of the absorption refrigeration type 10, and a refrigerant turbine 11.

The system will be explained in a case where, for example a flow rate of the flue gas is 100,000 m³/h. The flue gas is caused to flow into the system from an inlet 1 thereof at a temperature of 270° C, and its temperature is reduced from 270° to 240° C by the first heat exchanger 2. Its heat is then further reduced by the second heat exchanger 3 from 240° to 115° C. After this its heat is still further reduced by the third heat exchanger 4 from 115° to 70° C. The resultant gas at 70° C is then passed into the cooling tower 5.

In general, when the temperature of the flue gas is reduced, the steam contained in the gas is condensed to an acid aqueous liquid. In this connection, the third heat exchanger 4 is provided with a means for washing its coil intermittently with supply water to prevent corrosion due to the acid liquid.

In the cooling tower 5, cooling water is supplied continuously to cool and wash the flue gas. Consequently, the temperature of the gas is reduced to less than 30° C, and it is then passed into the absorbing tower 6.

The heat obtained by the second heat exchanger 3 is supplied into the absorption refrigerator 9 to produce a refrigeration generation therein. In the refrigerator 9, the purifying liquid for the gaseous pollutants $SO_2$ is thus cooled to a temperature of 0° C and then sent to the absorbing tower 6 by a pump 13 for carrying out therein desulfurization of the flue gas.

The gas purified in the absorbing tower 6 is reduced in temperature to about 10° C and is sent by the blower 7 to the heater 8, where it is reheated to a temperature of about 50° C. After passing through the heater 8, the purified gas is passed to a stack 14 to exit therefrom into the atmosphere.

Hot water at a temperature of 70° C is supplied to the heater 8 for heating the purified gas. This hot water is produced in the heat pump 10 which is operable by the heat obtained from the flue gas in the first and third heat exchangers 2 and 4.

As described above, a part of the refrigeration generation generated from the refrigerator 9 is applied to cool the purifying liquid, and a part of the heat generated from the heat pump 10 is applied for heating the purified gas in the heater 8. The remainder of the refrigeration generation and the remainder of heat generated from the heat pump 10 as well as the remainder of heat removed from the first heat exchanger 2 are applied to the refrigerant turbine 11 which uses ammonia as a refrigerant to produce motive power for the blower 7 and the other operating elements.

The turbine 11 comprises an evaporator 20, a superheater 21, a turbine body 22, condenser 23 and a pump 24.

The above-mentioned system will be described in detail in an example of analysis procedure.

1. Fundamental calculation of the absorption refrigerator 9. is provided by reference to FIG. 3, where in a Duhring diagram showing operational states of the absorption refrigerator, A shows a state of vapor of $NH_3$ produced in the regenerator, B shows a state of condensation of $NH_3$ and C shows a state of vaporization of $NH_3$. At the point C a refrigeration effect at $-5°$ C is produced. D shows a state of the absorber.

To condense the vapor of $NH_3$ it is required to be cooled to a temperature of 30° C.

1-1. The following flow rates of the aqua ammonia are assumed to calculate heat balance in the refrigerator 9.

|  | Concentration of $NH_3$ (weight %) | $NH_3$ (kg/h) | $H_2O$ (kg/h) | Total |
|---|---|---|---|---|
| A strong solution | 48.6 | 5,500 | 5,817.8 | 11,317.8 |
| A weak solution | 43.6 | 4,500 | 5,817.8 | 10,317.8 |
| $NH_3$ |  | 1,000 |  |  |

1-2. From a Concentration-Enthalpy Diagram for liquid ammonia based upon the condition that enthalpy of $H_2O$ is zero at 0°C, the enthalpies of the mediums at the points in FIG. 3 are read as follows.

|  |  |  |
|---|---|---|
| $NH_3$: 30°C | $i'$ = | 118.84 Kcal/kg |
|  | $i''$ = | 392.43 Kcal/kg |
|  | $r$ = | 273.59 Kcal/kg |
| $-5°C$ | $i'$ = | 79.5 Kcal/kg |
|  | $i''$ = | 385.14 Kcal/kg |
|  | $r$ = | 305.64 Kcal/kg |
| 43.6% solution: | 80°C | 62.6 Kcal/kg |
|  | 36°C | 12.6 Kcal/kg |
| 48.6% solution: | 72°C | 56 Kcal/kg |
|  | 31°C | 13.5 Kcal/kg |

1-3. Efficiencies of heat exchange used in the calculation.

|  |  |
|---|---|
| vapor - vapor | $\eta = 0.98$ |
| vapor - liquid | $\eta = 0.96$ |
| liquid - liquid | $\eta = 0.95$ |

1-4. The regenerator (R)
Heat rejected by 43.6 percent solution at 80° C = 10,317.8 × 62.6 = 645,894.3 Kcal/h
Heat rejected by $NH_3$ at 30° C = 1,000 × 392.43 = 392.430 Kcal/h
Heat added by 48.6 percent solution at 72° C = 11,317.8 × 56 = 633,796.8 Kcal/h
Heat to be added from the exterior at 80° C = 404,527.5 Kcal/h 1-5. The condenser (C)
Heat of condensation at 30° C (to be removed by a cooling operation) = 273,590 Kcal/h 1-6. The evaporator (E)
Heat rejected by $NH_3$ vapor at $-5°$ C = 1,000 × 385.14 = 385,140 Kcal/h
Heat added by $NH_3$ liquid at 30° C = 1,000 × 118.84 = 118,840 Kcal/h
Refrigeration generation at $-5°$ C = (385,140 − 118,840) × 0.96 = 255,648 Kcal/h 1-7. The absorber (A)
Heat added by $NH_3$ vapor at $-5°$ C = 385,140 Kcal/h
Heat added by 43.6 percent solution at 36° C = 10,317.8 × 12.6 = 130,004.3 Kcal/h
Heat rejected by 48.6 percent solution 31° C = 11,317.8 × 13.5 = 152,790.3 Kcal/h
Heat of absorption (to be removed by a cooling operation) = 362,354 Kcal/h 1-8. The heat exchanger (He)
Internal heat produced from 43.6 percent solution reducing a temperature from 80° to 36° C = 10,317.8 × (62.6 − 12.6) × 0.95 = 515,890 Kcal/h Necessary heat to be added by 48.6 percent solution increasing in temperature from 31° to 72° C = 11,317.8 × (56 − 13.5) = 481,006.5 Kcal/h Surplus heat = 490,095.5 − 481,006.5 = 9,089 Kcal/h 1-9. Summary
Heat to be added from the exterior at 80° C = 404,527.5 Kcal/h
Refrigeration generation at $-5°$ C = 255,648 Kcal/h Heat to be rejected by cooling at 30° C = 273,590 + 362,354 = 635,944 Kcal/h 2. Fundamental calculation of the heat pump 10.

The heat pump 10 shown in FIG. 1 is a type of a triple stage absorption refrigerator which uses aqueous solutions of 50 percent lithium bromide and 55 percent lithium bromide. Its operational states are shown in FIG. 4, a Duhring diagram. In the heat pump the 50 percent LiBr solution is vaporized up to the 55 percent LiBr solution. Referring to FIGS. 1 and 4, a first quantity of steam is produced from the 50 percent solution in the first regenerator ($r_1$) at a pressure of 8.0759 kg/cm² and a temperature of 215° C corresponding to the point E. The resultant steam is then condensed in the first condenser ($C_1$) at a temperature of 170° C corresponding to the point F.

The second regenerator ($R_2$) is heated by the heat of condensation removed from the first quantity of steam. A second quantity of steam is produced from the 50 percent solution in the second regenerator at a pressure of 1,804 kg/cm² and a temperature of 160° C corresponding to the point G. The resultant second quantity of steam is then condensed in the second condenser ($C_2$) at a temperature of 118° C. The third regenerator ($R_3$) is heated by the heat of condensation removed from the second quantity of steam, whereby a third quantity of steam is produced from the 50 percent solution at a pressure of 0.3931 kg/cm² and a temperature of 108° C corresponding to the point I. The resultant third steam is then condensed in the third quantity of condenser ($C_3$) at a temperature of 75° C corresponding to the point J.

The condensed water collected from the first, second and third condensers is vaporized in the evaporator (E)

at a pressure of 0.1258 kg/cm² and a temperature of 50° C corresponding to the point K by an external heat source. The produced steam is then absorbed in the absorber (A) at a state corresponding to the point L by the 55 percent solution at a temperature of 75° C. Output heat generated from the heat pump includes the heat of condensation of the third quantity of steam and the heat of absorption mentioned above.

2-1. The following conditions of aqueous LiBr solution are assumed to calculate heat balance in the heat pump.

|  | Concentration of LiBr (weight %) | LiBr (kg/h) | H₂O (kg/h) | Total (kg/h) |
|---|---|---|---|---|
| A strong solution | 50 | 5,500 | 5,500 | 11,000 |
| A weak solution | 55 | 5,500 | 4,500 | 10,000 |
| Steam |  |  | 1,000 |  |

2-2. From Steam table and Enthalpy-Concentration diagrams for aqueous LiBr solution based upon the condition that enthalpy of $H_2O$ is zero at 0° C, the enthalpies of the mediums at the points in FIG. 4 are read as follows.

| Steam: | 170°C | $i'$ = 271.68 Kcal/kg |
|---|---|---|
|  |  | $i''$ = 761.1 Kcal/kg |
|  |  | $r$ = 489.42 Kcal/kg |
|  | 118°C | $i'$ = 218.22 Kcal/kg |
|  |  | $i''$ = 745.43 Kcal/kg |
|  |  | $r$ = 527.21 Kcal/kg |
|  | 75°C | $i'$ = 174.94 Kcal/kg |
|  |  | $i''$ = 729.1 Kcal/kg |
|  |  | $r$ = 554.16 Kcal/kg |
|  | 50°C | $i'$ = 149.95 Kcal/kg |
|  |  | $i''$ = 718.8 Kcal/kg |
|  |  | $r$ = 568.85 Kcal/kg |
| LiBr 50% solution: | 202°C | 140.2 Kcal/kg |
|  | 150°C | 114.5 Kcal/kg |
|  | 103°C | 98.8 Kcal/kg |
|  | 75°C | 78.48 Kcal/kg |
| LiBr 55% solution: | 215°C | 137.0 Kcal/kg |
|  | 160°C | 114.9 Kcal/kg |
|  | 108°C | 90.2 Kcal/kg |
|  | 80°C | 78.3 Kcal/kg |

2-3. Efficiencies of heat exchange used in the calculation

| vapor - vapor | $\eta$ = 0.98 |
|---|---|
| vapor - liquid | $\eta$ = 0.96 |
| liquid - liquid | $\eta$ = 0.95 |

2-4. The first stage

The first regenerator ($R_1$);
Heat rejected by a 55 percent solution at 215° C = 10,000 × 137 = 1,370,000 Kcal/h
Heat rejected by a steam at 170° C = 1,000 × 761.1 = 761,100 Kcal/h
Heat added by a 50 percent solution at 202° C = 11,000 × 140.2 = 1,542,200 Kcal/h
Heat to be added from the exterior at 215° C = 588,900 Kcal/h The first condenser ($C_1$);
Heat added by steam at 170° C = 761,100 Kcal/h
Heat rejected by hot water at 170° C = 1,000 × 271.68 = 271,680 Kcal/h
Heat of condensation at 170° C = 489,420 Kcal/h The second stage The second regenerator ($R_2$);
Heat rejected by a 55 percent solution at 160° C = 10,000 × 114.9 = 1,149,000 Kcal/h
Heat rejected by steam at 118° C = 1,000 × 745.43 = 745,430 Kcal/h
Heat added by a 50 percent solution at 150° C = 11,000 × 114.5 = 1,259,500 Kcal/h
Heat to be added from the exterior at 160° C = 634,930 Kcal/h The second condenser ($C_2$);
Heat added by steam at 118° C = 745,430 Kcal/h
Heat rejected by hot water at 118° C = 1,000 × 218.22 = 218,220 Kcal/h
Heat of condensation at 118° C = 527,210 Kcal/h The third stage The third regenerator ($R_3$);
Heat rejected by a 55 percent solution at 108° C = 10,000 × 90.2 = 902,000 Kcal/kg
Heat rejected by steam at 75° C = 1,000 × 729.1 = 729,100 Kcal/h
Heat added by a 50 percent solution at 103° C = 11,000 × 90.8 = 998,800 Kcal/h
Heat to be added from the exterior = 632,300 Kcal/h The third condenser ($C_3$);
Heat added by steam at 75° C = 729,100 Kcal/h
Heat rejected by hot water at 75° C = 1,000 × 174.94 = 174,940 Kcal/h 2-5. Calculation in a combination of the triple stages Heat for heating the second regenerator ($R_2$) = 489,420 × 0.96 = 469,843.2 Kcal/h In this connection, the values in the second stage set forth in the item 2-4 are modified by multiplying them by $\alpha$ as follows. Where $\alpha$ = 469,843.2/634,930 = 0.7399

The second stage;
Quantity of condensed water = 1,000 × $\alpha$ = 739.9 kg/h
Heat of condensation = 527,210 × $\alpha$ = 390,082.7 kcal/h
Heat for heating of the third regenerator ($R_3$) = 390,082.7 × 0.96 = 374,479.4 Kcal/h In this connection, the values in the third stage set forth in the item 2-4 are modified by multiplying by $\beta$ as follows. Where $\beta$ = 374,479.4/632,300 = 0.5922

The third stage;
Quantity of condensed water = 1,000 × $\beta$ = 592.2 kg/h
Heat of condensation = 554,160 × $\beta$ = 328,173.5 Kcal/h
The total amount of the condensed water = 1,000 + 739.9 + 592.2 = 2,332.1 kg/h 2-6. The heat exchanger (He)
Internal heat produced from the condensed water reducing the temperature from 170° C to 80° C = 1,000 × (171.68 − 79.95) = 91,730 kcal/h
Internal heat produced from the condensed water reducing the temperature from 118° C to 80° C = 739.9 × (118.22 − 79.95) = 28,316 kcal/h
Internal heat produced from the 55 percent solution reducing the temperature from 215° to 80° C = 10,000 × (137 − 78.3) = 587,000 Kcal/h
Internal heat produced from the 55 percent solution reducing the temperature from 160° to 80° C = 7,399 × (114.9 − 78.3) = 270,803.4 Kcal/h Internal heat produced from the 55 percent solution reducing the temperature from 108° to 80° C = 5,922.4 × (90.2 − 78.3) = 70,471.8 Kcal/h The total of the internal heat amounts to 1,048,321.2 Kcal/h Heating capacity = 1,048,321.2 × 0.95 = 995,051.1 Kcal/h Heat required for heating the 50 percent solution from 75° C to 202° C = 11,000 × (140.2 − 78.48) = 678,920 Kcal/h Heat required for heating the 50 percent solution from 75° C to 150° C = 8,138.9 × (114.5 − 78.48) = 293,163.2 Kcal/h Heat required for heating the 50 percent solution from 75° C to 103° C = 6,514.2 × (90.8 − 78.48) = 80,254.9 Kcal/h The total of the necessary heat amounts to 1,052,338.1 Kcal/h Insufficient value of heating capacity = 1,052,338.1 − 995,905.1 = 56.433 Kcal/h 2-7. The evaporator The condensed water is heat-exchanged and then is introduced into the evaporator at the resultant temperature of 80° C.

Heat added by the condensed water at 80° C from the first and second stages = (1,000 + 739.9) × 179.95 = 313,095.0 Kcal/h Heat added by the condensed water at 75° C from the third stage = 592.2 × 174.94 = 103,599.5 Kcal/h Heat rejected by the evaporated steam at 50° C = 2,332.1 × 718.8 = 1,676,313.5 Kcal/h Heat required for evaporation of the condensed water = 1,259,619.0 ÷ 0.96 = 1,312,103.1 Kcal/h 2-8. Flow rates of the two solutions in the respective stages.

|  | 55% solution | 50% solution |
|---|---|---|
| The first stage | 10,000 kg/h | 11,000 kg/h |
| The second stage | 7,399 kg/h | 8,138.9 kg/h |
| The third stage | 5,922 kg/h | 6,514.2 kg/h |
| Total | 23,321 kg/h | 25,653.1 kg/h |

2-9. The absorber (A)

The combined 55 percent solution discharged from the stages is subjected to a heat exchange and then is introduced into the absorber at the resultant temperature of 80° C.

Heat added by the 55 percent solution = 23,321 × 78.3 = 1,826,034.3 Kcal/h

Heat added by the steam at 50° C = 2,332.1 × 718.8 = 1,676,313.5 Kcal/h

Heat rejected by the 50 percent solution at 75° C = 25,653.1 × 78.48 = 2,013,255.3 Kcal/h Heat of absorption = 1,826,034.3 + 1,676,313.5 − 2,013,255.3 = 1,489,092.5

2-10. Heat to be added in the heat pump system

High temperature heat;

Heat to be added from the exterior to the first stage regenerator (more than 215° C) = 588,900 Kcal/h Additional heat required for heating the 50 percent solution (202° C) = 56,433 Kcal/h Total of the above heat = 645,333 Kcal/h Low temperature heat;

Heat required for heating the evaporator (50° C) = 1,312,103.1 Kcal/h 2-11. Produced heat Heat of absorption (75° C) = 1,489,092.5 Kcal/h Heat of condensation in the third stage (75° C) = 328,173.5 Kcal/h Total of the heat = 1,817,266 Kcal/h Effective heat = 1,817,266 × 0.96 = 1,744,575.4 Kcal/h 3. Fundamental calculation of the refrigerant turbine 11

Referring to FIG. 5, a Mollier diagram showing stages of the refrigerant $NH_3$ in the refrigerant turbine, a $NH_3$ vapor generated at a pressure of 33.77 kg/cm² and a temperature of 70° C corresponding to the point N is heated to 160° C in the superheater 21 under the pressure. Subsequently the heated vapor is introduced into the turbine body 22 to be expanded until its temperature is reduced to −1.12° C. By this operation the state of vapor is changed from O to P and thus a power equivalent to the work done by the vapor during the process PO' is obtained. The segment of line PQ represents the latent heat of the vapor at −1.12° C. When the vapor is cooled until a temperature of the point Q, it is fully condensed to a liquid. The pressure of the resultant liquid is elevated to 33.77 kg/cm² by the pump 24. The pressurized liquid is given a heat of 70° C from the heat pump 10 during the process Q'MN, and is thus changed to a vapor. The above cycle of the process N-O-P-Q-Q'-M-N is repeated and during each cycle the power equivalent to the work done by the vapor during the process PO' is created.

The heat required and the power obtained in the refrigerant turbine 11 are as follows.

Heating load: heated from −1.12° C to 70° C = 83.94 Kcal/h a latent heat at 70° C = 224.6 Kcal/h superheated from 70° C to 160° C = 71.58 Kcal/h Total = 380.12 Kcal/h Cooling load: a latent heat at −1.12° C = 302.44 Kcal/h Theoretical power = 380.12 − 302.44 = 77.68

Practical Power = 77.66 × 0.85 = 66.028

4. Heat calculation of the whole system in a combination of the absorption refrigerator 9, the heat pump 10 and the refrigerant turbine 11.

4-1. Heat removed from the flue gas by the three heat exchangers 2, 3 and 4.

| Volume rate of the flue gas at 270°C: | 100,000 m³/h |
|---|---|
| Heating value of heavy oil: | 10,100 Kcal/kg |
| Excess air rate: | 1.20 |
| Heat exchange efficiency: | 0.90 |

Under the above assumption, the heat removed by the first to third heat exchangers 2, 3 and 4 is computed as follows.

The first heat exchanger 2: from 270° to 240° C $$q_1 = (90 − 80) \times 100,000 = 1,000,000 \text{ Kcal/h}$$

Removed heat $q_1\eta$ = 1,000,000 × 0.9 = 900,000 Kcal/h

The second heat exchanger 3: from 240° to 115° C $q_2 = (80 - 37.5) \times 100,000 = 4,250,000$ Kcal/h Removed heat $q_2\eta = 4,250,000 \times 0.9 = 3,825,000$ Kcal/h The third heat exchanger 4: from 115° to 70° C $q_3 = (37.5 - 22) \times 100,000 = 1,550,000$ Kcal/h Removed heat $q_3\eta = 1,550,000 \times 0.9 = 1,395,000$ Kcal/h 4-2. Heat removed from the flue gas by the cooling tower 5: from 70° to 30° C under the condition of $\eta = 0.95$ $q_4 = (22 - 9.5) \times 100,000 = 1,250,000$ Kcal/h Heat removed for cooling the gas in the cooling tower 5:

$q_4' = q_4/\eta = 700,000 \div 0.95 = 736,842$ Kcal/h 4-3. The absorption refrigerator 9

The heat removed by the second heat exchanger ($q_2\eta = 3,825,000$ Kcal/h) is used to heat the absorption refrigerator 9. The refrigerator has the refrigeration capacity of 255,648 Kcal/h under the requirement of heat for heating the regenerator equivalent to 404,527.5 Kcal/h, as indicated in the fundamental calculation of the refrigerator. In this connection, the modified refrigeration capacity $q_e\eta$ of the refrigerator is computed as follows.

$q_e\eta = 255,648 \times 3,825,000/404,527.5 = 2,417,272$ Kcal/h (−5° C)

Sensitive heat removed $q_5$ for cooling the flue gas from 30° to 10° C in the absorbing tower 6 is computed as follows.

$q_5 = (9.5 - 3) \times 100,000 = 650,000$ Kcal/h

Latent heat of condensation $q_6$ of the steam involved in the flue gas is calculated approximately based upon the following data which are read from the table of wet air (NC chart).

| | |
|---|---|
| 30°C | 0.03039 H₂O kg/m³ |
| 10°C | 0.00941 H₂O kg/m³ |

$q_6 = (0.03039 - 0.00941) \times 100,000 \times 591.5 = 1,240,967$ Kcal/h

Where 591.5 represents a latent heat of condensation of the steam at 10° C (Kcal/kg).

Heat removed for cooling the flue gas in the absorbing tower 6
$= (q_5 + q_6) \div \eta' = (650,000 + 1,240,967) \div 0.95$
$= 1,990,491.6$ Kcal/h
where $\eta' = 0.95$ Consequently, the remainder $q_7$ of the refrigeration capacity is computed as follows.

$q_7 = q_e\eta - 1/\eta' (q_5 + q_6) = 2,417,272 - 1,990,491.6$
$= 426,780.4$ Kcal/h 4-4. Heating of the purified gas The heat removed by the third heat exchanger ($q_3\eta = 1,395,000$ Kcal/h) is applied as a heating source of the evaporator (E) in the heat pump 10. The heat pump has the heating capacity of 1,744,575.4 Kcal/h under requirements of the low temperature heat for heating the evaporator equivalent to 1,312,103.1 Kcal/h and the high temperature heat for heating the regenerators equivalent to 645,333.0 Kcal/h as indicated in the fundamental calculation of the heat pump.

In this connection, the modified high temperature heat $q_8$ and the modified heating capacity or generated heat $q_9$ are computed as follows.

$q_8 = 1,395,000/1,312,103.1 \times 645,333 = 686,098.7$ Kcal/h $q_9 = 1,395,000/1,312,103.1 \times 1,744,575.4 = 1,854,780.2$ Kcal/h Heat required $q_{10}'$ for heating the purified gas from 10° to 50° C:

$q_{10} = (15 - 3) \times 100,000 = 1,200,000$ Kcal/h
$q_{10}' = q_{10}/\eta = 1,333,333.3$ Kcal/h The remainder of the generated heat $q_9$
$= 1,854,780.2 - 1,333,333.3 = 521,446.9$ Kcal/h 4-5. The refrigerant turbine 11

The fundamental calculation of the turbine indicates:

Heating load per unit (up to 70° C) = 308.54 Kcal/kg NH₃

Superheating load per unit (from 70° to 160° C) = 71.58 Kcal/kg

Generated Power per unit = 66.028 Kcal/kg NH₃

The remainder of the refrigeration capacity ($q_7 = 426,780.4$ Kcal/h) is applied for as a cooling load of the turbine. In this connection, the circulating flow of NH₃ in the turbine is $426,780.4 \div 302.44 = 1,411.12$ kg/h and thus the whole load and power are computed as follows.

Heating load (up to 70° C) = $308.54 \times 1,411.12 = 435,388.2$ Kcal/h

Superheating load (from 70° to 160° C) = $71.58 \times 1,411.12 = 101,008$ Kcal/h Practical power = $66.028 \times 1,411.12 = 93,173.4$ Kcal/h = $93,173.4 \div 860 = 108.3$ KW/h 5. Summary of the analysis procedure in the system.

5-1. The flue gas: 100,000 Nm³/h at 270° C 5-2. The heating capacity obtained from the heat exchangers 2, 3 and 4.

The first heat exchanger 2; $q_1\eta = 900,000$ Kcal/h (applied for heating the refrigerant solution in the heat pump 10 at the high temperature and heating the refrigerant NH₃ in the turbine 11)

The second heat exchanger 3; $q_2\eta = 3,825,000$ Kcal/h (applied for heating the refrigerant solution in the absorption refrigerator 9)

The third heat exchanger 4; $q_3\eta = 1,395,000$ Kcal/h (applied for heating the refrigerant solution in the heat pump 10 at the low temperature)

5-3. The cooling tower 5

Heat removed for cooling the flue gas from 70° to 30° C; $q_4' = 1,315,789.5$ Kcal/h (by means of a cooling water)

5-4. The absorption refrigerator 9

Heat required for heating the refrigerant solution; $q_2\eta = 3,825,000$ Kcal/h (given by the second heat exchanger 3)

Refrigeration capacity; $q_e\eta = 2,417,272$ Kcal/h (−5° C)

5-5. The heat pump 10

Low temperature heat to be added from the third heat exchanger 4 to the evaporator (E) in the heat pump (50° C);

$q_3\eta = 1,395,000$ Kcal/h

High temperature heat to be added from the first heat exchanger 2 to the regenerator ($R_1$) (215° C) and the heat exchanger (He) (202° C) in the heat pump: $q_8 = 686,098.7$ Kcal/h Heat generated (heat of absorption in the absorber and heat of condensation in the third stage condenser ($C_3$) at 75° C):
$q_9 = 1,854,780.2$ Kcal/h 5-6. The absorbing tower 6 for $SO_2$ Heat removed for cooling the gas from 30° to 10° C (removed by the absorption refrigerator 9): $1/\eta \, (q_5 + q_6) = 1,990,491.6$ Kcal/h 5-7. The heater 8 for the purified gas Heat added at 70° C from the heat pump 10 $q_{10}' = 1,333,333.3$ Kcal/h 5-8. The refrigerant turbine 11

Heating load at 70° C (the remainder of the heat generated from the heat pump 10):
$q_{11} = 435,388.2$ Kcal/h Cooling load at −1.12° C (the remainder of the refrigeration capacity produced from the absorption refrigerator 9):
$q_7 = 426,780.4$ Kcal/h Generated power
$q_{13} = 93,173.4$ Kcal/h = 108.3 KWH 5-9. Heat balance The remainder of the heat removed by the first heat exchanger 2:

$$q_1\eta - q_8 - q_{12} = 900,000 - 686,098.7 - 101,008 = 112,893.3 \text{ Kcal/h}$$

The heat removed by the second heat exchanger 3 is fully applied for the absorption refrigerator 9. The heat removed by the third heat exchanger 4 is fully applied for the heat pump. The refrigeration capacity produced by the absorption refrigerator 9 is fully applied for the absorbing tower 6 and the refrigerant turbine 11.

The remainder of the heat generated by the heat pump:

$$q_9 - q_{10}' - q_{11} = 1,854,780.2 - 1,333,333.3 - 435,388.2 = 86,058.7 \text{ Kcal/h.}$$

What I claim is:

1. A wet type desulfurization system for a stream of flue gas involving sulfurous gases, comprising a plurality of serially interconnected heat exchangers; means for passing the flue gas through said heat exchangers, whereby the temperature of said flue gas is successively reduced to about 70° C; a cooling tower means receiving said temperature reduced flue gas from the last of the serially interconnected heat exchangers for further cooling said flue gas to a temperature of about 30° C, whereby the gas is pre-desulphurized; an absorbing tower connected to the cooling tower and receiving the flue gas at the temperature of about 30° C; a refrigerated purifying liquid introduced into said absorbing tower in direct contact with said flue gas, thereby purifying the flue gas and reducing the temperature thereof to about 10° C; a heater in the path of the purified gas from the absorption tower for raising the temperature of the purified flue gases whereby the heated purified gases may diffuse into the atmosphere; a first absorption refrigerator comprising a first condenser, a first evaporator and a first absorber and a first regenerator; a heat pump absorption refrigerator comprising a second condenser, a second evaporator and a second absorber and a second regenerator; means for conducting heat from at least one of the heat exchangers to the first regenerator, whereby the first evaporator is cooled; means for conducting said purifying liquid through said first evaporator for refrigerating said purifying liquid to a temperature of about 0° C; means for conducting the heat from at least one of said heat exchangers to said second regenerator whereby said second evaporator is cooled, a coolant liquid circulated between the second evaporator and at least one of the heat exchangers for removing heat from said heat exchanger; and means for conducting heat from the second absorber to said heater.

2. A system as recited in claim 1 wherein the refrigerant in the first absorption refrigerator comprises an aqueous solution of ammonia; wherein the refrigerant in said heat pump absorption refrigerator comprises an aqueous solution of lithium bromide; and further comprising a blower connected between said absorbing tower and said heater for conducting said purified gas to said heater.

3. A system as recited in claim 1, further comprising a refrigerant turbine; means connected to at least one of said heat exchangers for conducting the heat from said heat exchanger to drive said turbine; a third refrigerator driven by said turbine for further cooling said purifying liquids.

* * * * *

UNITED STATES PATENT OFFICE
CERTIFICATE OF CORRECTION

Patent No. 3,839,849     Dated October 8, 1974

Inventor(s) GOHEE MAMIYA

It is certified that error appears in the above-identified patent and that said Letters Patent are hereby corrected as shown below:

On the title page, the name of the inventor is misspelled,

"Maniya" should read -- Mamiya --.

Column 1, line 18, change "of the" to -- at a --.

Column 3, line 54, change "392.430" to -- 392,430 --.

Column 7, line 20, change "56.433" to -- 56,433 --.

Column 10, lines 8 and 10: change "1,395,000/1,312,103.1"
to -- (1,395,000/1,312,103.1) --.

Signed and sealed this 11th day of February 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,839,849          Dated October 8, 1974

Inventor(s) GOHEE MAMIYA

It is certified that error appears in the above-identified patent and that said Letters Patent are hereby corrected as shown below:

Column 4, line 45, change "regenerator ($r_1$)" to -- regenerator ($R_1$) --;

Column 4, line 55, change "of 1,804 Kg/cm$^2$" to -- of 1.804 Kg/cm$^2$ --.

Column 8, lines 39 and 40, change "Kcal/h a latent heat at 70°C = 224.6Kcal/h superheated" to -- Kcal/h; a latent heat at 70°C = 224.6Kcal/h; and superheated --.

Signed and sealed this 18th day of March 1975.

(SEAL)
Attest:

RUTH C. MASON
Attesting Officer

C. MARSHALL DANN
Commissioner of Patents
and Trademarks